(12) United States Patent
Baumann et al.

(10) Patent No.: US 7,699,600 B2
(45) Date of Patent: Apr. 20, 2010

(54) FLEXIBLE PLATE SLOT FOR A HOT RUNNER INJECTION MOLDING SYSTEM

(75) Inventors: Martin Baumann, Burlington, VT (US); Manon Danielle Belzile, Fairfield, VT (US); Patrice Fabien Gaillard, Milton, VT (US)

(73) Assignee: Husky Injection Molding Systems Ltd., Bolton, Ontario (CA)

( * ) Notice: Subject to any disclaimer, the term of this patent is extended or adjusted under 35 U.S.C. 154(b) by 204 days.

(21) Appl. No.: 12/039,824

(22) Filed: Feb. 29, 2008

(65) Prior Publication Data

US 2009/0191300 A1    Jul. 30, 2009

Related U.S. Application Data

(63) Continuation-in-part of application No. 12/022,226, filed on Jan. 30, 2008, now abandoned.

(51) Int. Cl.
B29C 45/22 (2006.01)
(52) U.S. Cl. ........................... 425/564; 425/572
(58) Field of Classification Search ................. 425/562, 425/563, 564, 565, 566, 572
See application file for complete search history.

(56) References Cited

U.S. PATENT DOCUMENTS

| | | | |
|---|---|---|---|
| 3,198,394 A | 8/1965 | Lefer | |
| 3,985,486 A | 10/1976 | Hendry | |
| 4,121,740 A * | 10/1978 | Gabrys | ....................... 425/549 |
| 5,980,236 A | 11/1999 | Gellert et al. | |
| 6,162,043 A | 12/2000 | Gellert | |
| 6,206,674 B1 | 3/2001 | Foltuz et al. | |
| 6,234,783 B1 * | 5/2001 | Shibata et al. | ............... 425/562 |
| 6,814,315 B2 | 11/2004 | Gould et al. | |
| RE39,935 E | 12/2007 | Babin | |
| 2006/0286197 A1 | 12/2006 | Manda et al. | |

* cited by examiner

Primary Examiner—Tim Heitbrink (57) ABSTRACT

A flexible plate system for a hot runner assembly includes a backing plate; a manifold plate detachably connected to the backing plate; a manifold positioned between the backing plate and the manifold plate and having at least one nozzle associated therewith; and wherein the manifold plate has at least one plate slot that allows the nozzle to extend through the manifold plate and having at least a first lateral dimension substantially larger than the outside diameter of the nozzle. The manifold plate and the backing plate may be configured to have at least one manifold plate cavity and at least one backing plate cavity to accept at least one nozzle insert and at least one piston cylinder insert respectively, the nozzle insert having a nozzle bore or a plurality of insert slots therethrough for installation of the nozzle, and the piston cylinder insert having a cylinder bore for a piston cylinder.

9 Claims, 14 Drawing Sheets

FLEXIBLE PLATE SLOT FOR A HOT RUNNER INJECTION MOLDING SYSTEM

CROSS REFERENCES

This patent application is a continuation in part patent application of prior U.S. patent application Ser. No. 12/022,226, filed Jan. 30, 2008. This patent application also claims the benefit and priority date of prior U.S. patent application Ser. No. 12/022,226, filed Jan. 30, 2008.

TECHNICAL FIELD OF THE INVENTION

The present invention relates generally to the field of injection molding equipment and, more particularly, to an improved hot runner mounting system.

BACKGROUND OF THE INVENTION

Hot runner manifold systems are utilized to transfer molten material, typically plastic resin, from an injection molding machine to a mold. Hot runner manifold systems typically include a manifold plate, a manifold housed in the manifold plate, and a backing plate that supports the manifold and manifold plate. The manifold system routes molten material from a central sprue, which connects to an injection unit on an injection molding machine, to a plurality of nozzles which inject the molten material into cavities in the mold. The manifold system divides the flow of the molten material into several branches as it flows from the central sprue to the nozzles.

Figure 1:
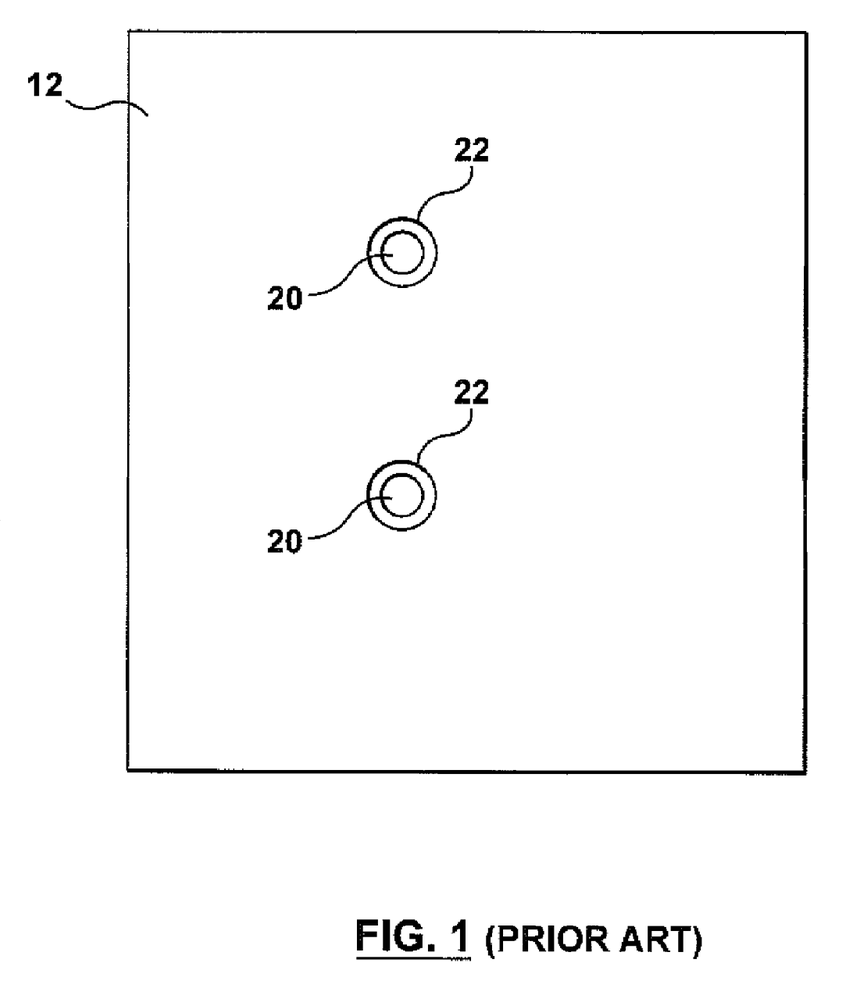
FIG. 1 is a plan view of a prior art hot runner system showing the manifold plate and nozzles extending therethrough.
Figure 2:
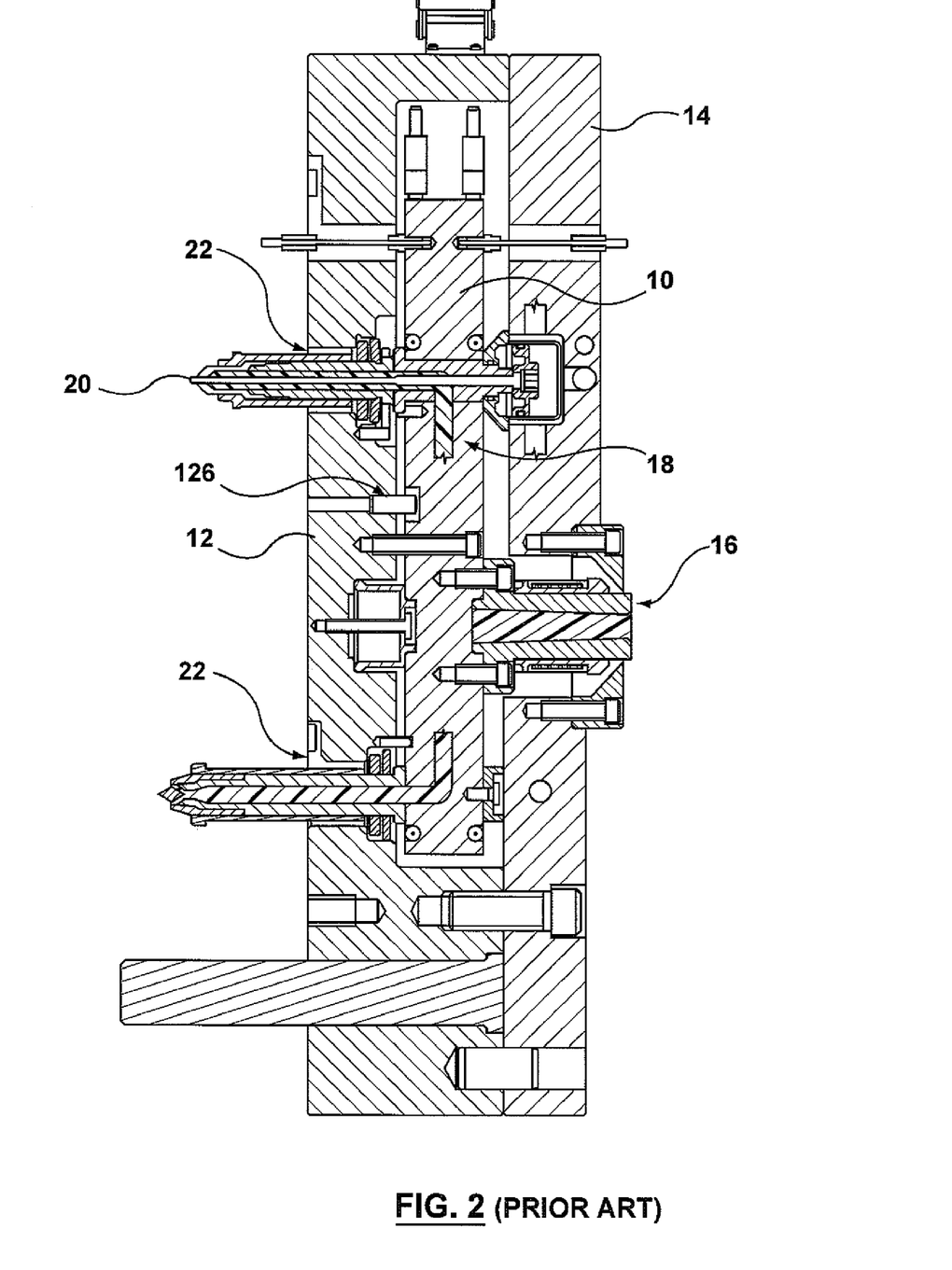
FIG. 2 is a cross sectional view of the prior art hot runner system shown in FIG. 1.
Figure 3:
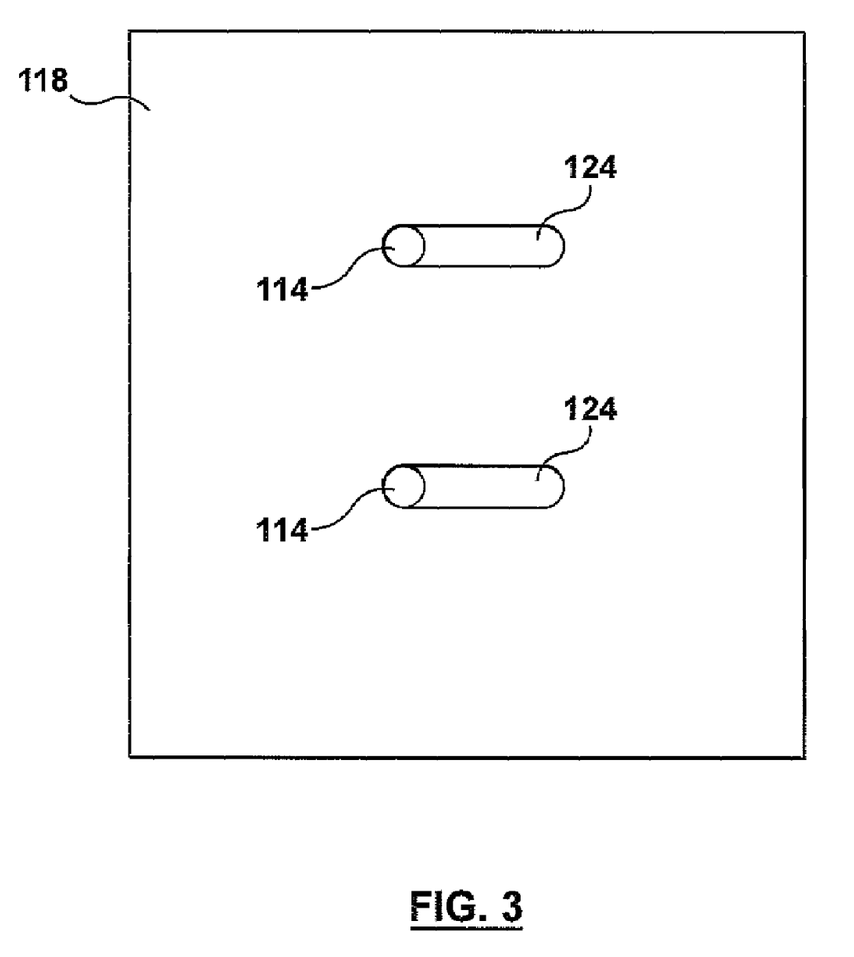
FIG. 3 is a plan view of a hot runner system according to one embodiment of the present invention showing the manifold plate and nozzles extending therethrough.

Referring to FIGS. 1 and 2, a prior art manifold system using two plates is shown with portions of the plates and main manifold cut away to reveal internal detail. A manifold assembly 10 is located between a manifold plate 12 and a backing plate 14. Sprue 16 connects to the manifold 10 at a central location. Manifold 10 has one or more melt channels 18 that communicate the molten material from the manifold 10 to nozzles (not shown) connected to the manifold 10.

One limitation of these prior art systems is that the backing plate 14 and manifold plate 12, in addition to the manifold 10, must be replaced each time a new hot runner system is desired. While the need for new manifolds and nozzles is largely unavoidable, the possibility of reusable plates represents a significant potential cost and time saving benefit. Even though the backing and manifold plates add relatively little value to a hot runner system relative to the manifolds and nozzles, these parts can represent as much as 30-40% of the cost of a new hot runner system Therefore, it would be desirable to provide a hot runner plate system that is reusable with new or modified manifolds and nozzles.

The present invention is directed to meeting one or more of the above-stated desirable objectives.

SUMMARY OF THE INVENTION

One aspect of the present invention is to provide a hot runner plate system that may be reused with new or modified manifold(s) and nozzles in a different configuration.

In accordance with the above aspects of the invention, there is provided a flexible plate system for a hot runner assembly that includes a backing plate; a manifold plate detachably connected to the backing plate; a mold manifold positioned between the backing plate and the manifold plate and having at least one nozzle associated therewith; and wherein the manifold plate has at least one plate slot that allows the nozzle to extend through the manifold plate and having at least a first lateral dimension substantially larger than the outside diameter of the nozzle.

In an another embodiment, the manifold plate has a plurality of dowel holes located along the perimeter of the plate slot to accommodate dowels for positive location of the nozzle relative to the plate slot.

In yet another embodiment, the manifold plate has at least one manifold plate cavity to accept at least one nozzle insert, the nozzle insert having a nozzle bore therethrough for installation of the nozzle.

In another embodiment, the nozzle bore through the nozzle insert may be manufactured at a plurality of lateral locations therein to allow for flexibility of positions of the nozzle within the manifold plate.

In yet another embodiment, the nozzle insert itself has at least one insert slot that allows the nozzle to extend through the nozzle insert and having at least one second lateral dimension substantially larger than the outside diameter of the nozzle. The nozzle insert may have a plurality of external geometries to match a plurality of internal geometries of the manifold plate cavity and may be rotatable within the manifold plate cavity to afford a plurality of positions of the nozzle.

In another embodiment, the nozzle insert has a plurality of dowel holes located along the perimeter of the insert slot to accommodate dowels for positive location of the nozzle relative to the insert slot.

In yet another embodiment, the backing plate has at least one backing plate cavity to accept at least one piston cylinder insert, the piston cylinder insert having at least one cylinder bore therein for installation of the piston cylinder required to control actuation of the valve stem in a valve gate nozzle system. The piston cylinder insert may have a plurality of external geometries to match a plurality of internal geometries of the backing plate cavity.

These aspects are merely illustrative of the various aspects associated with the present invention and should not be deemed as limiting in any manner. These and other objects, aspects, features and advantages of the present invention will become apparent from the following detailed description when taken in conjunction with the referenced drawings.

BRIEF DESCRIPTION OF THE DRAWINGS

Reference is now made to the drawings which illustrate the best known mode of carrying out the invention and wherein the same reference numerals indicate the same or similar parts throughout the several views.

DETAILED DESCRIPTION

In the following detailed description, numerous specific details are set forth in order to provide a thorough understanding of the invention. However, it will be understood by those skilled in the art that the present invention may be practiced without these specific details. For example, well-known methods, procedures, and components have not been described in detail so as not to obscure the present invention.

FIGS. 3-8 illustrate the overall arrangement of a first embodiment of an improved hot runner injection molding system. The device includes a mold manifold 110, having manifold melt channel 112 through which molten material reaches injection nozzles 114. The mold manifold 110 is surrounded and supported by a backing plate 116 and a manifold plate 118. The mold manifold 110 is, in effect, "sandwiched" between the backing plate 116 and manifold plate 118.

Figure 9:
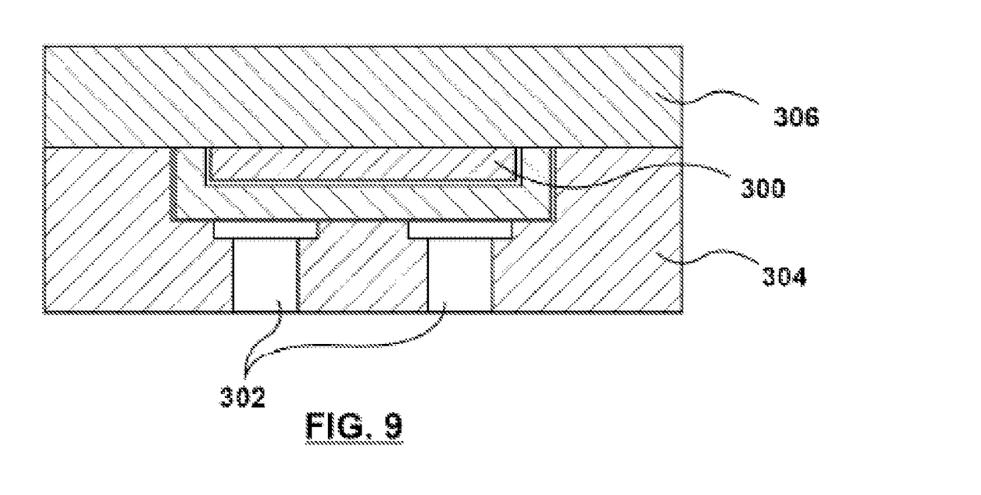
FIG. 9 is a cross sectional view of a system according to another embodiment of the present invention.
Figure 10:
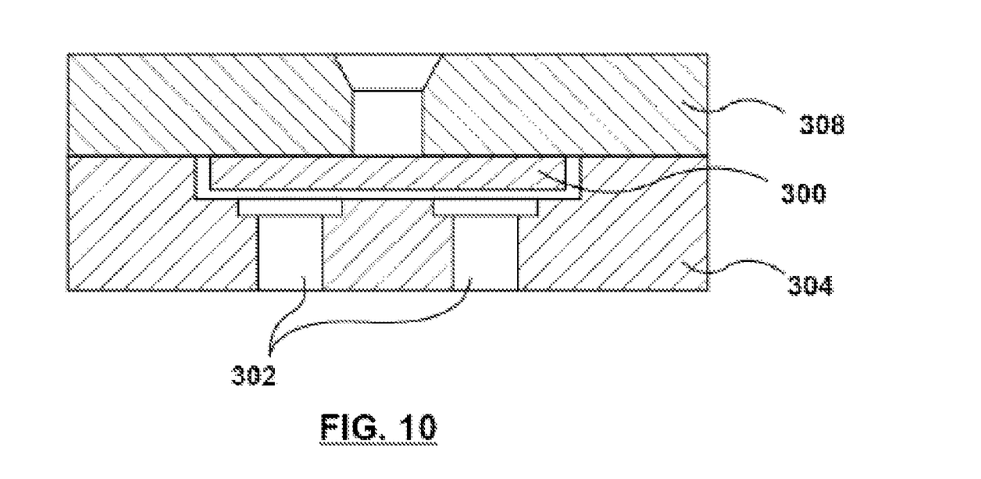
FIG. 10 is a cross sectional view of a system according to yet another embodiment of the present invention.

While FIGS. 3-8 illustrate one embodiment, in some cases either the manifold plate 118 or the backing plate 116 may be considered to be part of the mold assembly rather than the hot runner assembly. A shown in FIG. 9, the manifold 300 and nozzles 302 may be located in a hot runner manifold plate 304 that is either inserted or mounted to the mold plates (not shown) with the backing plate 306 taking the form of a mold plate (considered as part of the mold rather the hot runner). In another embodiment, illustrated in FIG. 10, the backing plate is eliminated and a machine platen 308 is used to contain the hot runner system. Those of skill in the art will appreciate that the present invention is equally suitable for use with any of these different structural arrangements.

The central sprue 120 delivers melt to the mold manifold 110. Melt then passes through a plurality of manifold melt channels 112 within the mold manifold 110 to the injection nozzles 114, where it is delivered to each gate of the mold (not shown).

Figure 4:
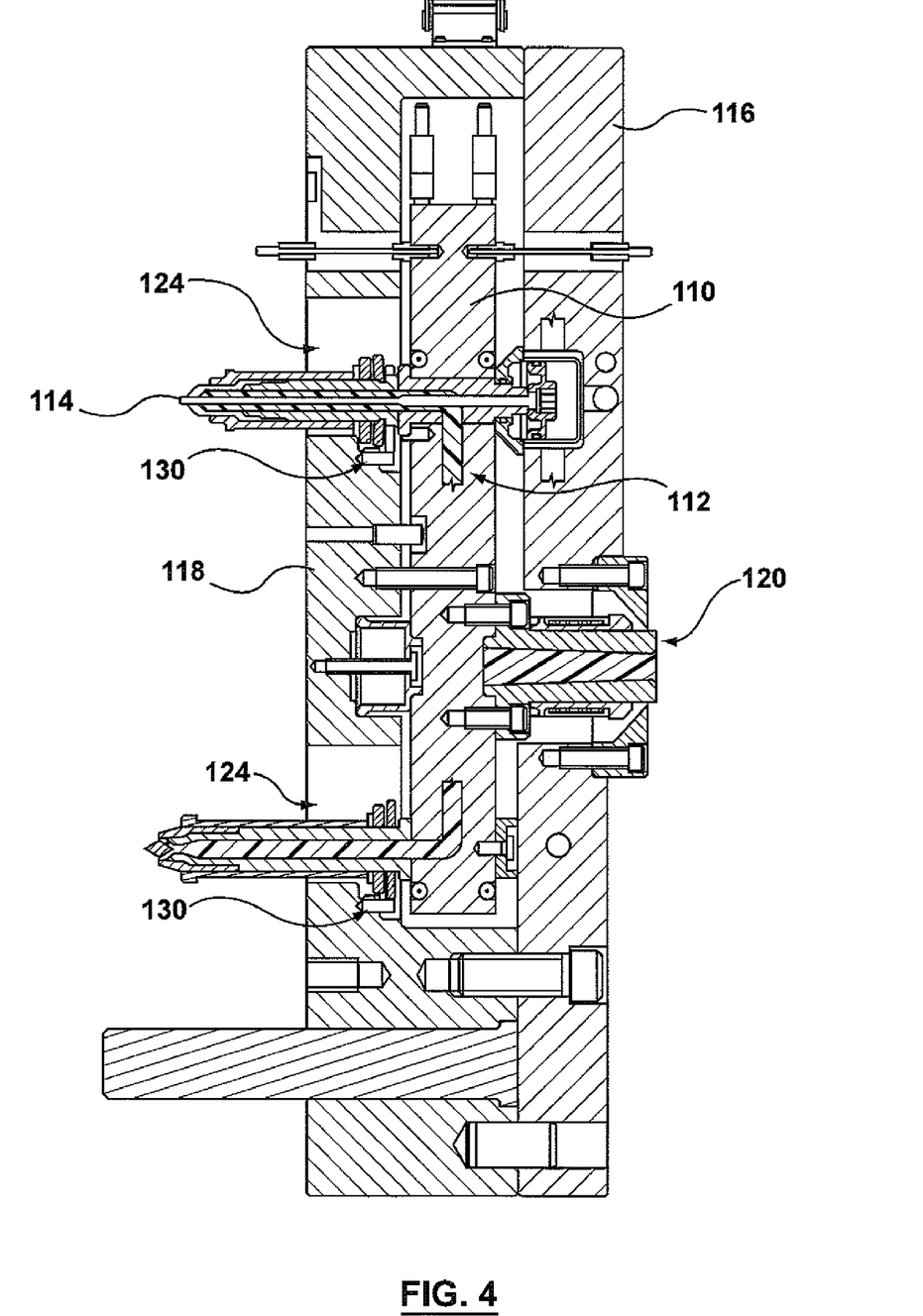
FIG. 4 is a cross-sectional view of the hot runner system of FIG. 3.

As can be seen most clearly in FIG. 4, each injection nozzle 114 protrudes through and extends out of the manifold plate 118. In prior art hot runner systems, as shown in FIGS. 1 and 2, a plate bore 124 is provided in the manifold plate 16 to accommodate each nozzle 114. The plate bore 124 is sized to match, with some clearance, the outside diameter of the nozzles 114. In the improved system disclosed herein, the manifold plate 118 is provided with plate slots 124. In one embodiment, these plate slots 124 are provided with a first lateral dimension—the width—that matches, again, with some clearance, the outside diameter of the nozzles 114. However, the plate slots 124 are provided with a second lateral dimension—the length—significantly longer than the diameter of the nozzles 114 such that the nozzles may be positioned in multiple locations along that slot length, thus providing the desired positioning flexibility. The length of the plate slots 124 may utilize any number of dimensions and is limited only by the nozzle configuration used in the hot runner system and thermal considerations.

Figure 7:
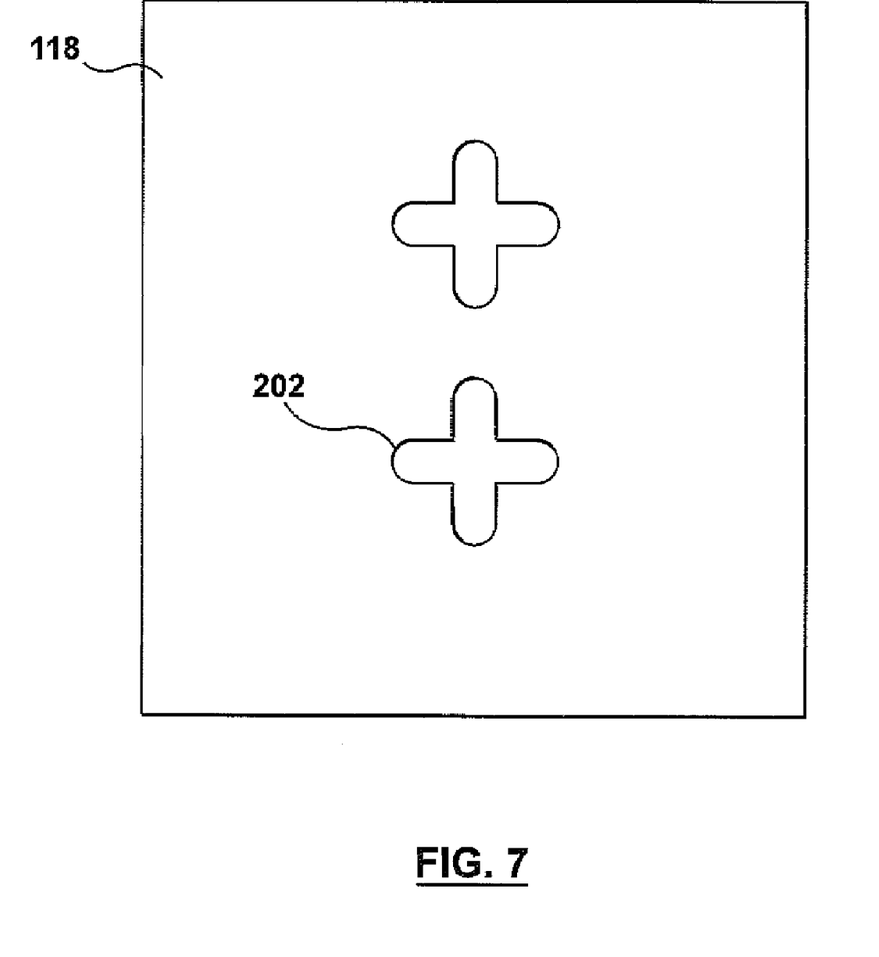
FIG. 7 is a bottom view of a manifold plate according to another embodiment of the present invention.
Figure 8:
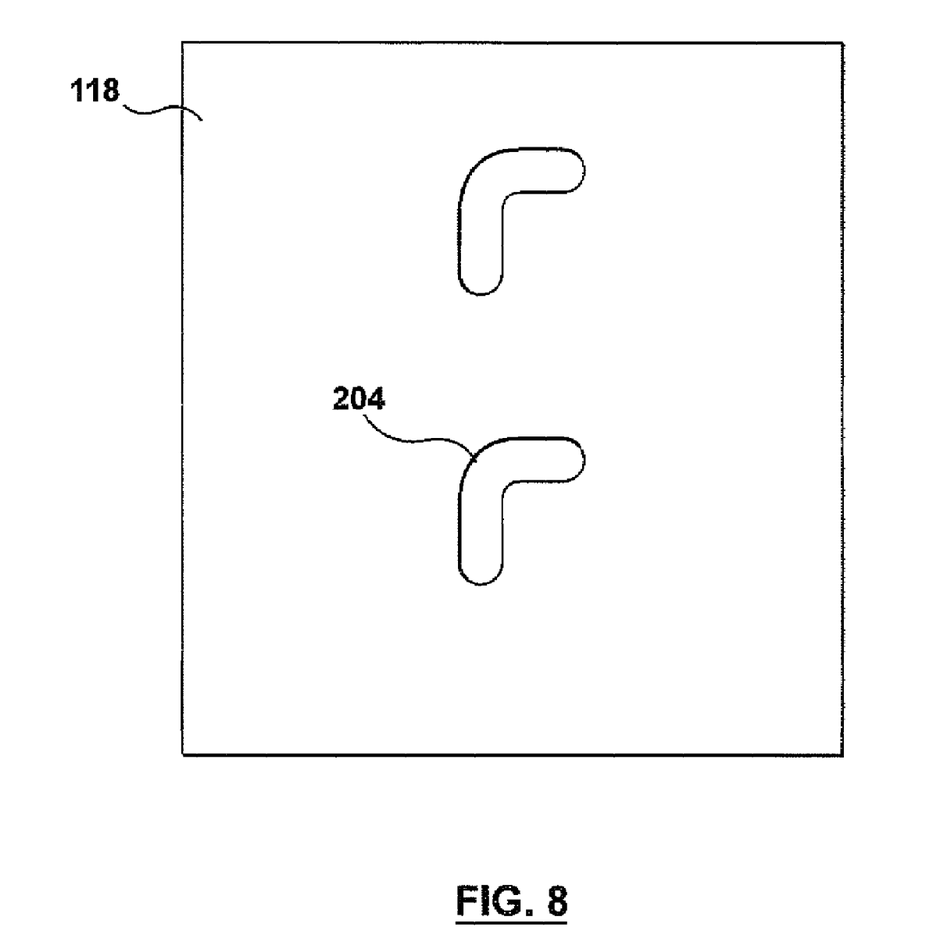
FIG. 8 is a bottom view of a manifold plate according to another embodiment of the present invention.

While an elongated slot has been previously described, it is contemplated as being within the scope of the present invention to use expanded openings in a variety of configurations. FIGS. 7 and 8 illustrate a number of non-limiting examples including a multi-leg slot 202, and an L-shaped slot 204. Thus, the term "plate slots" is intended to be non-limiting as to the shape of the enlarged opening contemplated by the present invention. The rounded ends or corners of such shapes obviously being intended to accommodate the rounded diameter of the nozzles.

It is typical in hot runner systems for dowels 126 to be used to position the mold manifold 110, and consequently the nozzles 114, relative to the manifold plate 118. These dowels 126 are frequently positioned between nozzles such that they do not directly relate to the plate bores or in the case of the present invention, plate slots. However, in an alternate embodiment of the present invention illustrated in FIG. 5, an additional multi-position positive locating mechanism may be incorporated in the plate slots 124 previously described. In one version of this embodiment, a plurality of dowel holes 128 are provided along the perimeter of the plate slots 124 to accommodate additional dowels 130 associated with each individual injection nozzle 114. The plurality of dowel holes 128 allow positive locating of the nozzles 114 relative to the plate slots in the multiple positions within the plate slots 124.

Figure 5:
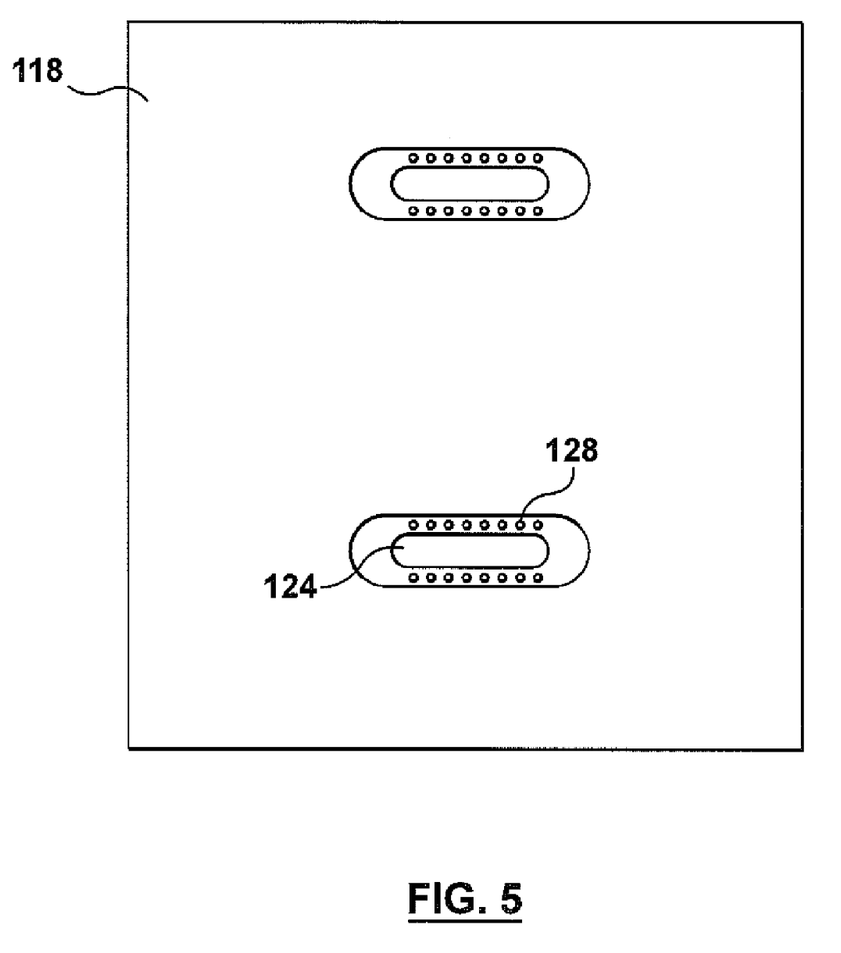
FIG. 5 is a top view of a manifold plate according to an embodiment of the present invention.
Figure 6:
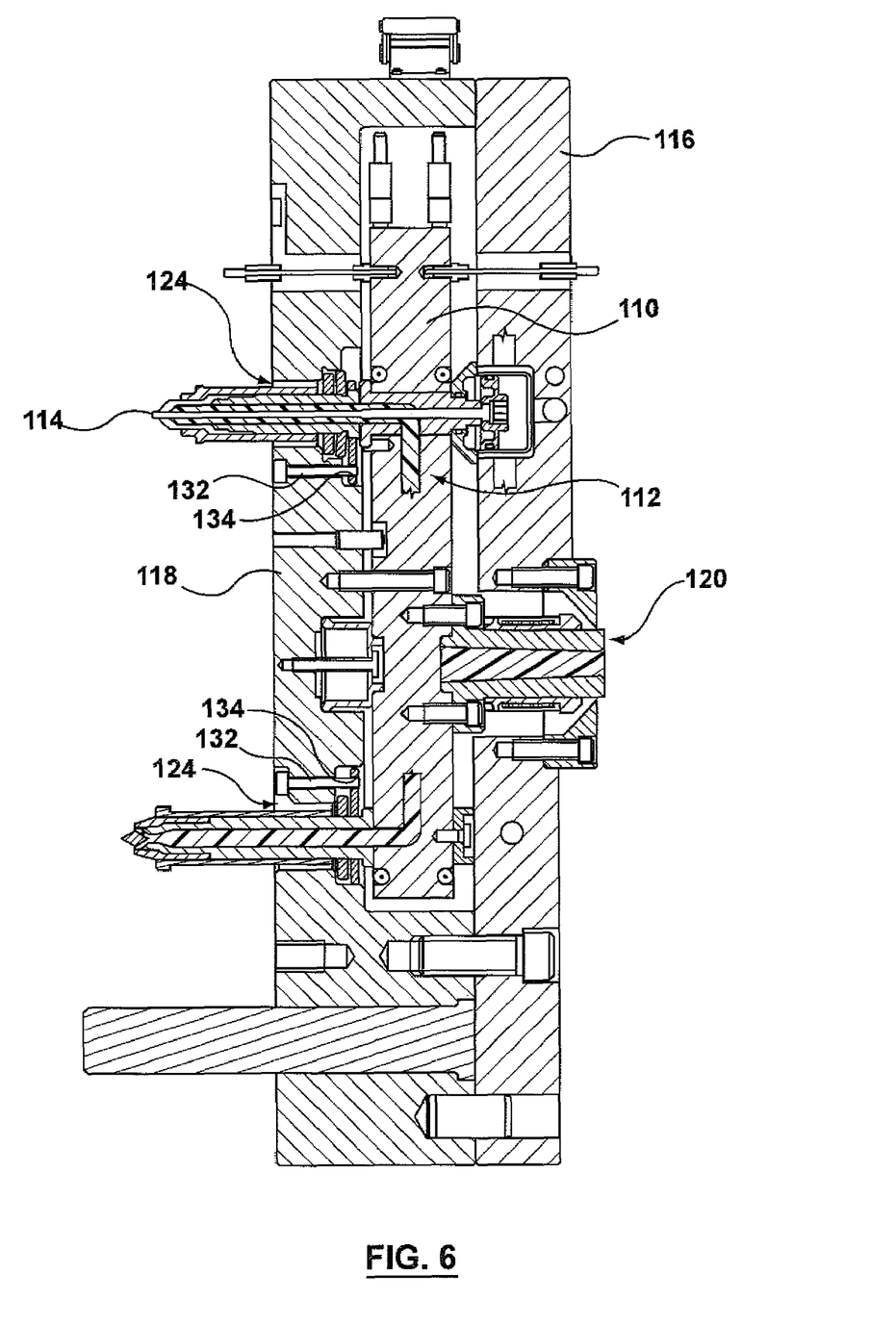
FIG. 6 is a cross sectional view of a hot runner system according to an alternate embodiment of the present invention.

In another version of this embodiment, screws 132 are utilized as the positioning device rather than dowels. In this version, a plurality of screw through holes 134 are positioned along the perimeter of the plate slots 124, and the screws 132 are inserted into those holes 134 from the outside of the manifold plate 118 and into a threaded hole (not shown) associated with each nozzle 114.

Figure 11:
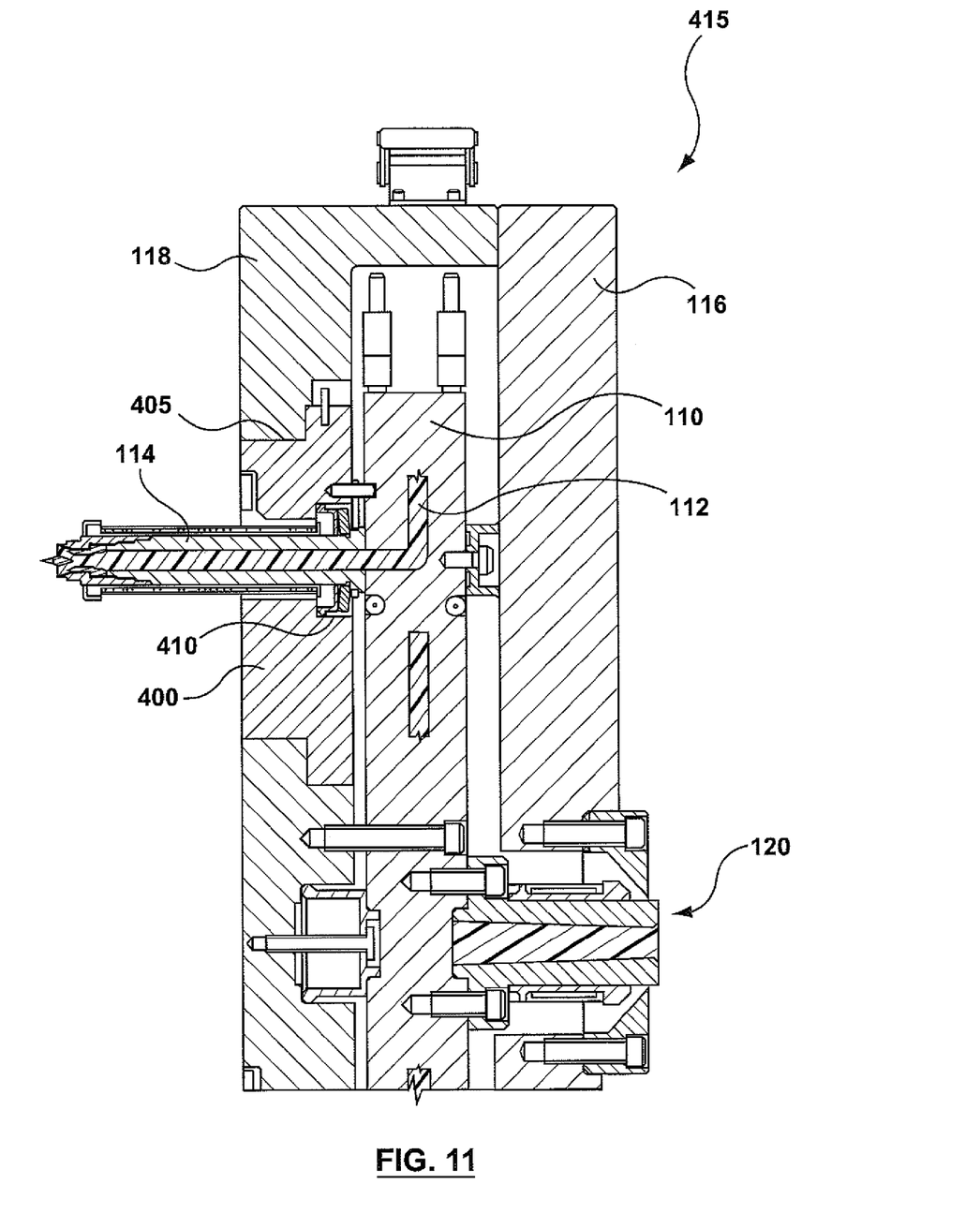
FIG. 11 is a cross sectional view of a system according to another embodiment of the present invention showing a nozzle insert in the manifold plate for a hot tip nozzle system.

In yet another embodiment of the present invention, a nozzle insert 400 is used to locate a nozzle 114 within a manifold plate 118 of a hot tip nozzle system 415. As illustrated in FIG. 11, the manifold plate 118 has at least one manifold plate cavity 405 to accept at least one nozzle insert 400, the nozzle insert 400 having a nozzle bore 410 therethrough for installation of said nozzle 114. The nozzle bore 410 is sized precisely to locate the nozzle 114 on its diameter to ensure exact alignment relative to the mold (not shown); however the nozzle bore 410 may be located at a plurality of positions within the nozzle insert 400 to match the mold location.

Figure 12A:
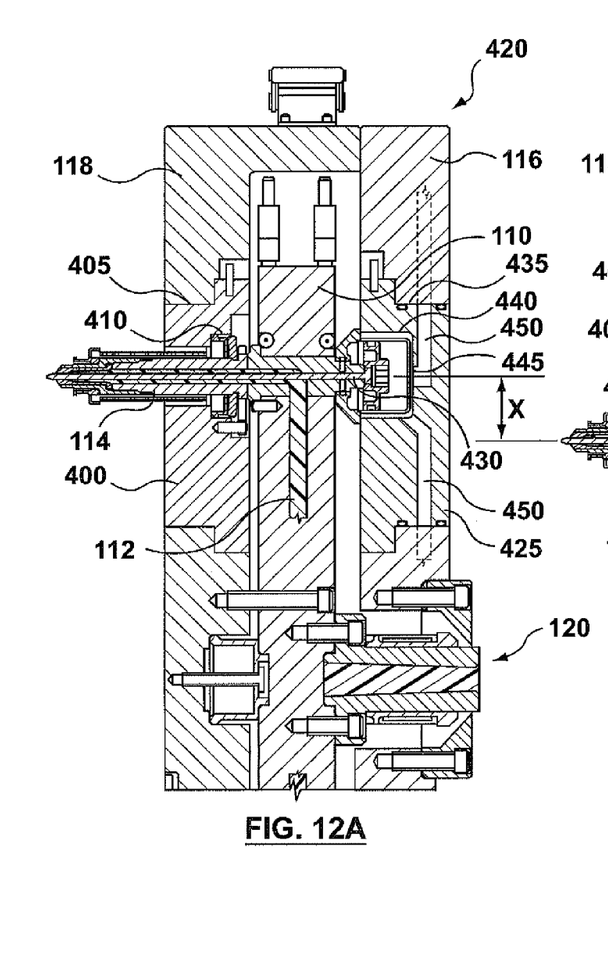
FIG. 12A is a cross sectional view of a system according to yet another embodiment of the present invention showing the nozzle insert and the piston cylinder insert in a first position.
Figure 12B:
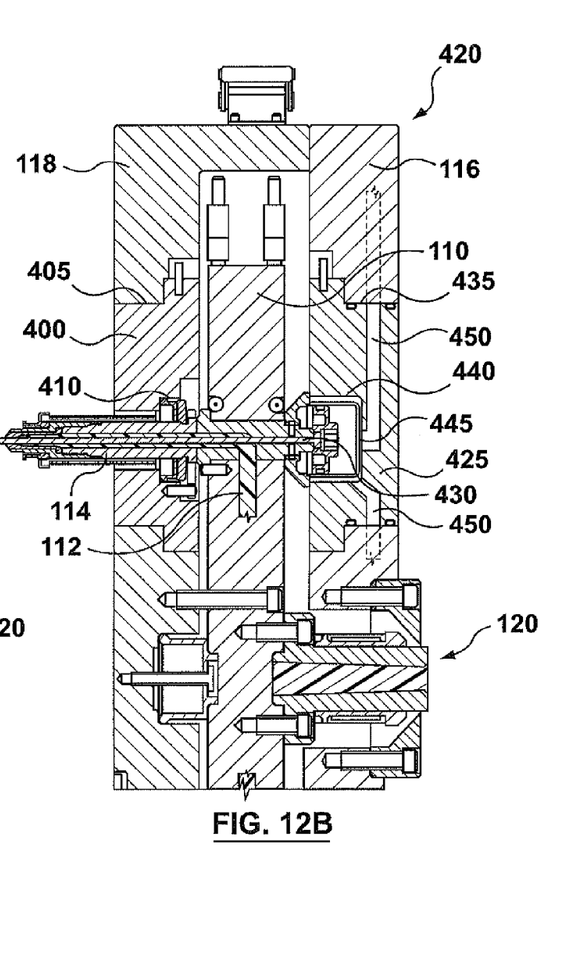
FIG. 12B is a cross sectional view of a system according to another embodiment of the present invention showing the nozzle insert and the piston cylinder insert in a second position, illustrating the resulting variance in nozzle positions between FIG. 12A and FIG. 12B.

In the case of a hot tip nozzle system 415 the nozzle insert 400 need only be installed in the manifold plate 118, whereas in the case of a valve gate nozzle system 420, as shown in FIG. 12, a piston cylinder insert 425 is also required to be installed in the backing plate 116. The backing plate 116 has at least one backing plate cavity 435 to accept at least one piston cylinder insert 425, the piston cylinder insert 425 having a cylinder bore 440 therein for installation of a piston cylinder 445, required to control actuation of a valve stem 430. The piston cylinder insert 425 is sized to fit the backing plate cavity 435, and may have a plurality of external geometries 455 to match a plurality of internal geometries 465 of the backing plate cavity 435. The piston cylinder insert 425 may also be plumbed with a plurality of conduits 450 necessary to provide a driving force to actuate said valve stem 430.

The interchangeability of a plurality of nozzle inserts 400 in a manifold plate cavity 405, or a plurality of piston cylinder inserts 425 in a backing plate cavity 435, renders said manifold plate 118 and said backing plate 116 reusable when married to a plurality of molds (not shown) as the nozzle 114 can be located at a plurality of locations as illustrated in FIG. 12 by dimension 'X'.

Figure 13A:
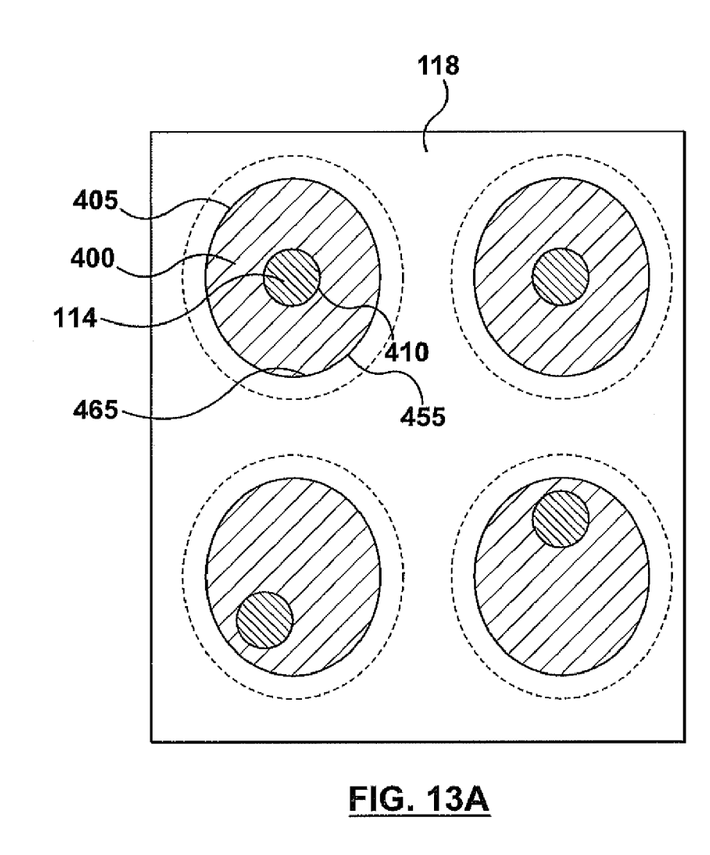
FIG. 13A is a plan view of a manifold plate showing both the external geometry of the nozzle insert as well as a plurality of nozzle bore locations therethrough.
Figure 13B:
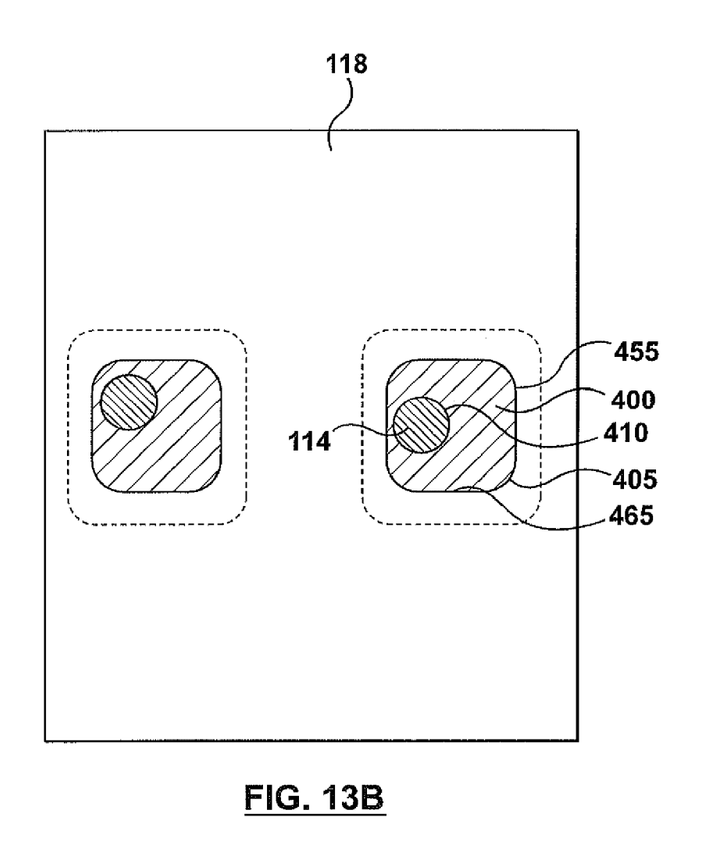
FIG. 13B is a plan view of a manifold plate showing both the external geometry of the nozzle insert as well as a plurality of nozzle bore locations therethrough.

As illustrated in FIGS. 13A and 13B, the nozzle insert 400 may have a plurality of external geometries 455 to match a plurality of internal geometries 465 of the manifold plate cavity 405. Additionally, within the nozzle insert 400, the nozzle bore 410 may be installed in a plurality of lateral positions thus offering flexibility of positioning a nozzle 114 within the manifold plate 118 by replacing the nozzle insert 400.

Figure 14A:
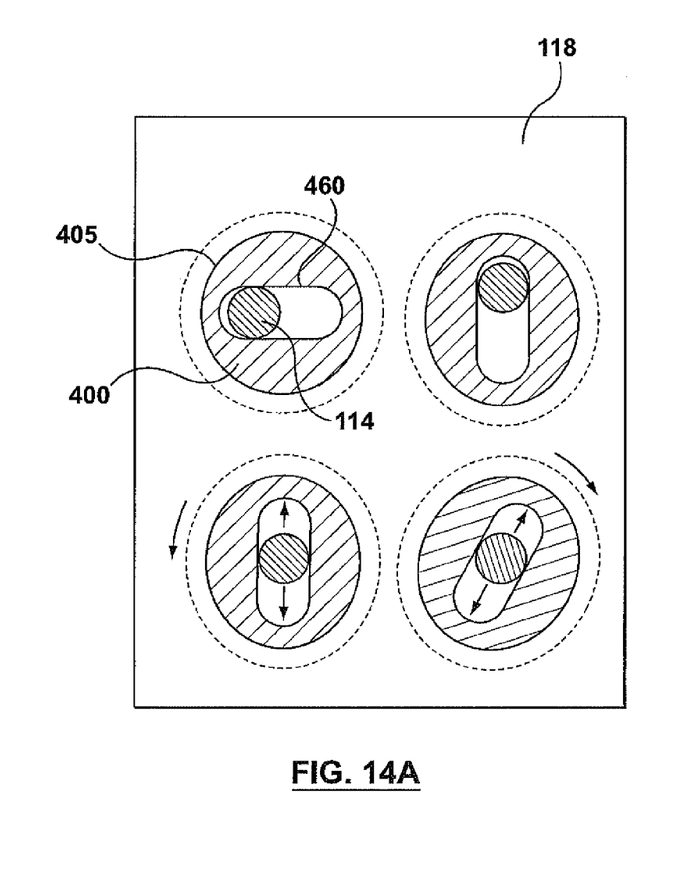
FIG. 14A is a plan view of a manifold plate showing a plurality of nozzle inserts each having an insert slot and illustrating a plurality of positions of the nozzle therein.
Figure 14B:
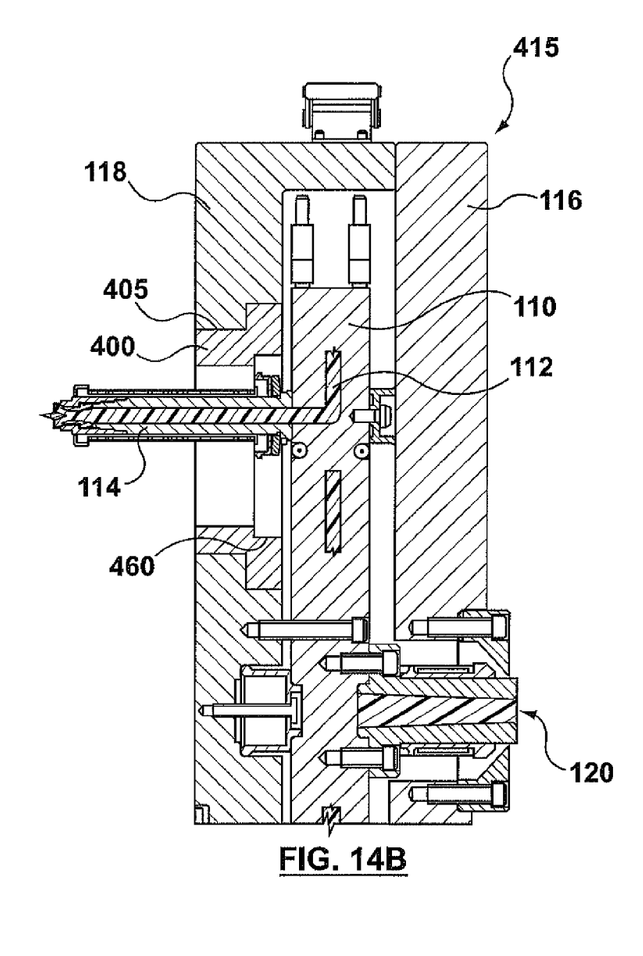
FIG. 14B is a cross sectional view of the embodiment of FIG. 14A illustrating the insert slot of the nozzle insert.

An extension of the aforementioned embodiment is illustrated in FIG. 14A wherein the nozzle insert 400 has at least one insert slot 460 which allows the nozzle 114 to extend through the nozzle insert 400. In this embodiment, the insert slot 460 is provided with a first lateral dimension—the width—that matches, again, with some clearance, the outside diameter of the nozzle 114. However, the insert slot 460 is provided with a second lateral dimension—the length—significantly longer than the diameter of the nozzle 114 such that the nozzle 114 may be positioned in a plurality of locations along the length of the insert slot 460, thus providing the desired positioning flexibility. The length of the insert slot 460 may utilize any number of dimensions and is limited only by the configuration of the nozzles 114 and thermal considerations. Additionally, the nozzle insert 400 may be rotated within the manifold plate cavity 405 allowing for yet another variation of positioning of the axis of the nozzle 114. A cross sectional view of a hot tip nozzle system 415 shown in FIG. 14B shows the nozzle 114 as it is engaged in an insert slot 460 of FIG. 14A.

While an elongated insert slot 460 has been previously described, it is contemplated as being within the scope of the present invention to use expanded openings in a variety of configurations. Referring back to FIGS. 7 and 8, a number of non-limiting examples including a multi-leg slot 202, and an L-shaped slot 204 are illustrated and may be interpreted for the same use within the nozzle insert 400 itself. Thus, the term "insert slot" 460 is intended to be non-limiting as to the shape of the enlarged opening contemplated by the present invention. Again, the rounded ends or corners of such shapes obviously being intended to accommodate the rounded diameter of the nozzles.

Figure 15:
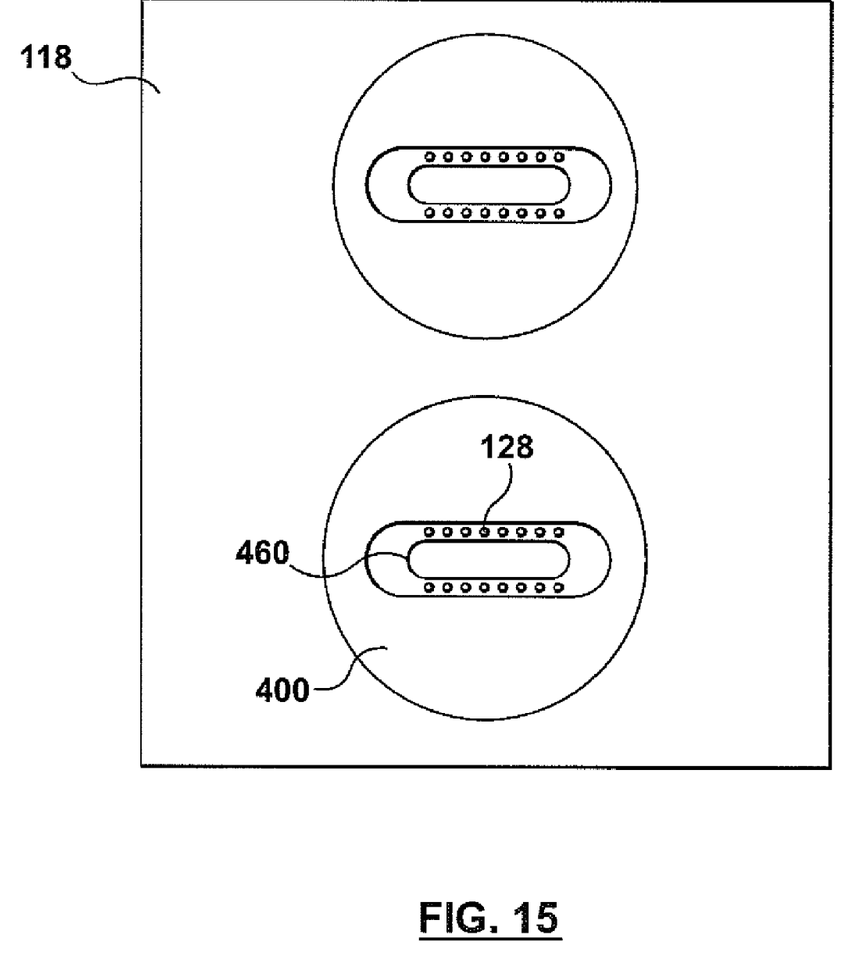
FIG. 15 is a top view of a manifold plate according to an embodiment of the present invention which uses dowel holes adjacent to an insert slot to positively locate a nozzle.

In FIG. 15, yet another embodiment of the present invention illustrates that an additional multi-position positive locating mechanism may also be incorporated in the nozzle insert 400, and more specifically, in the insert slot 460 previously described. In one version of this embodiment, a plurality of dowel holes 128 are provided along the perimeter of the insert slot 460 to accommodate additional dowels 130 associated with each individual injection nozzle 114. The plurality of dowel holes 128 allow positive locating of the nozzle 114 relative to the insert slot 460 in multiple positions within the insert slot 460.

In yet another version of this embodiment, screws 132 are utilized as the positioning device rather than utilizing a dowel 130. In this version, a plurality of screw through holes 134 are positioned along the perimeter of the insert slot 460, and the screws 132 are inserted into said through holes 134 from the outside of the nozzle insert 400 and into a threaded hole (not shown) associated with each nozzle 114.

Other objects, features and advantages of the present invention will be apparent to those skilled in the art. While preferred embodiments of the present invention have been illustrated and described, this has been by way of illustration and the invention should not be limited except as required by the scope of the appended claims and their equivalents.

We claim:

1. A flexible plate system for a hot runner assembly, comprising:
    a backing plate;
    a manifold plate detachably connected to said backing plate;
    a mold manifold positioned between said backing plate and said manifold plate and having at least one nozzle associated therewith, said at least one nozzle having an outside diameter;
    a nozzle insert; and
    wherein said manifold plate defines at least one manifold plate cavity therein, said at least one manifold plate cavity configured to accept said nozzle insert,
    wherein the nozzle insert locates the at least one nozzle within the manifold plate, the nozzle insert has a nozzle bore therethrough for installation of said at least one nozzle in the nozzle bore, the nozzle bore of the nozzle insert is sized to locate the at least one nozzle and to ensure alignment relative of the at least one nozzle to a mold, the mold to receive a melt from the at least one nozzle.

2. The flexible plate system for a hot runner assembly as set forth in claim 1, wherein said backing plate defines at least one backing plate cavity.

3. The flexible plate system for a hot runner assembly as set forth in claim 2, wherein said at least one backing plate cavity is configured to accept a piston cylinder insert, wherein said piston cylinder insert may have a plurality of external geometries to match a plurality of internal geometries of said at least one backing plate cavity.

4. The flexible plate system for a hot runner assembly as set forth in claim 3, wherein the piston cylinder insert further defines at least one cylinder bore to accommodate at least one piston cylinder.

5. A flexible plate system for a hot runner assembly, comprising:
    a manifold plate;
    a mold manifold positioned adjacent said manifold plate and having at least one nozzle associated therewith, said at least one nozzle having an outside diameter;
    a nozzle insert;
    wherein said manifold plate defines at least one manifold plate cavity therein, said at least one manifold plate cavity defined to accept said nozzle insert; and
    wherein said nozzle insert defines at least one insert slot, an insert slot allowing said at least one nozzle to extend through said nozzle insert and having at least a first lateral dimension that matches the outside diameter of said at least one nozzle, wherein the nozzle insert locates the at least one nozzle within the manifold plate, the nozzle insert has a insert slot therethrough for installation of said at least one nozzle in the insert slot, the insert slot of the nozzle insert is sized to locate the at least one nozzle and to ensure alignment relative of the at least one nozzle to a mold, the mold to receive a melt from the at least one nozzle.

6. The flexible plate system for a hot runner assembly as set forth in claim 5, wherein said insert slot has at least a second lateral dimension substantially larger than said outside diameter of said at least one nozzle.

7. The flexible plate system for a hot runner assembly as set forth in claim 5, wherein said insert slot defines a shape selected from the group consisting of an elongated slot, a multi-leg slot, and an L-shaped slot.

8. The flexible plate system for a hot runner assembly as set forth in claim 5, wherein said nozzle insert further defines a plurality of dowel holes along at least a portion of a perimeter of said insert slot to accommodate a dowel for positive location of said at least one nozzle relative to said insert slot.

9. The flexible plate system for a hot runner assembly as set forth in claim 5, wherein said nozzle insert further defines a plurality of screw through holes along at least a portion of a perimeter of said insert slot to accommodate a screw for positive location of said at least one nozzle relative to said insert slot.

* * * * *